July 12, 1927.
L. A. JOHNSON
1,635,753
LAMINATED SHIM
Original Filed July 31, 1924
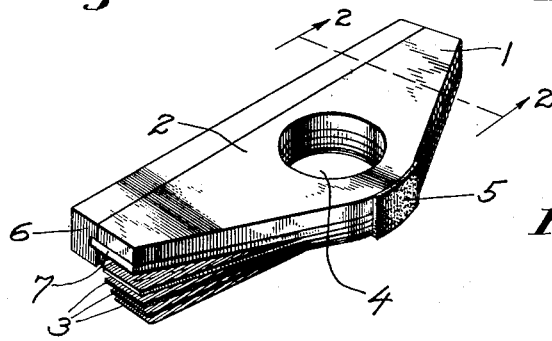
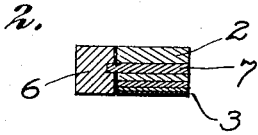
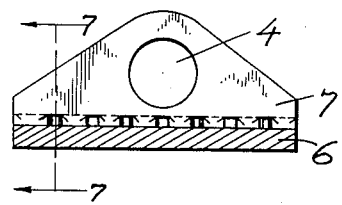
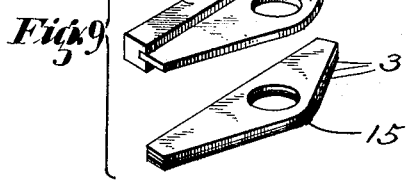
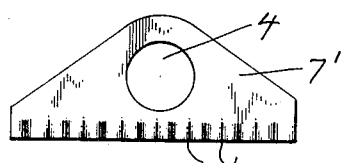
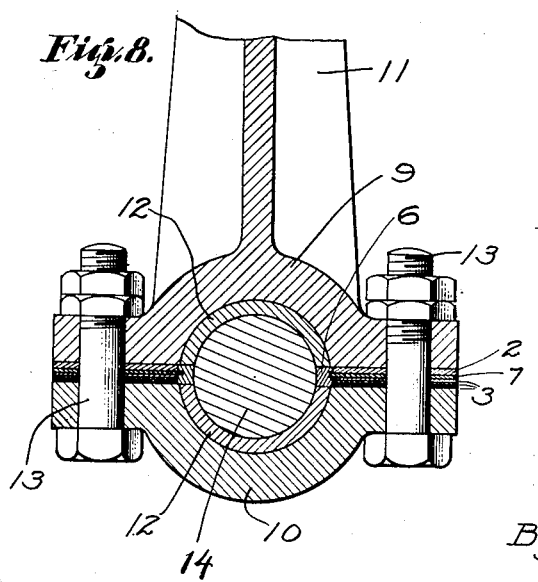
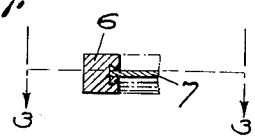
Inventor
Lloyd A. Johnson
By Dewey, Strong, Townsend & Loftus
Attorneys Patented July 12, 1927.

1,635,753

UNITED STATES PATENT OFFICE.

LLOYD A. JOHNSON, OF SAN FRANCISCO, CALIFORNIA.

LAMINATED SHIM.

Application filed July 31, 1924, Serial No. 729,390. Renewed May 23, 1927.

This invention relates particularly to laminated shims for use in connection with the bearings of internal combustion engines, farm machinery, and other mechanical equipment. Such bearings usually comprise bearing boxes made up of two half sections babbitted internally to receive the rotary element therein. These two half sections must be so accurately fitted together that the rotary element is held securely therein, but freely rotatable. To so accurately space these bearing halves, shims varying in thickness are used therebetween. Also as the babbitt of the bearing becomes worn in use, the bearing halves may be adjusted to take up this wear, and this adjustment is accomplished by removing certain of these shims.

In my copending application, Serial No. 727,231 filed July 21, 1924, I have disclosed an improved laminated shim comprising several sheets of laminations lightly stuck together at one edge thereof in a manner to be easily removed for the purpose defined. The primary object of my present invention is to provide such a shim with a block of Babbitt metal on the front or inner edge thereof, such block preferably being secured to only one of the intermediate laminations in a manner to be positioned between the babbitt sections of a bearing whereby the several blocks of babbitt will be compressed together to form a smooth and substantially jointless bearing when the parts are secured in place.

With the above and other objects in view, my invention consists in the features of construction and operation set forth in the following specification and illustrated in the accompanying drawing. In such drawing, annexed hereto and forming a part of this specification, I have illustrated certain detailed embodiments of my invention, but it will be understood that the invention can be otherwise embodied, and that the drawing is not to be construed as defining or limiting the scope of the invention, the claims appended to this specification being relied upon for that purpose.

Referring to the figures of the drawing:

Fig. 1 is a perspective view of a laminated shim embodying my invention.

Fig. 2 is a cross-section thereof taken on line 2—2 of Fig. 1.

Fig. 3 is a sectional view taken on line 3—3 of Fig. 7.

Fig. 4 is an edge view of the babbitt supporting sheet or lamination of the shim.

Fig. 5 is an elevation showing a modification of the shim shown in Figs. 3 and 4.

Fig. 6 is a front edge view thereof.

Fig. 7 is a cross-sectional view through the shim on line 7—7 of Fig. 3.

Fig. 8 is a cross-sectional view through a crank bearing showing two of my improved shims in use therein.

Fig. 9 is a perspective view illustrating the several parts of the shim disassembled.

The shim 1 shown in Fig. 1 of the drawing comprises a relatively thick sheet or plate of metal 2 having superimposed thereon a plurality of relatively thin sheets 3, the sheets 3 preferably varying in thickness as shown in Fig. 2. These sheets are formed to the shape of the bearing wherein they are adapted to be used and are provided with a bolt receiving opening 4 therethrough. As illustrated in Fig. 1 all of these sheets are lightly and detachably secured together with a small portion of solder 5 on the rear thereof. An elongated block of soft metal 6, preferably babbitt, is secured to the front edge of the shim in the manner and for the purpose hereinafter described. For the purpose of illustration, the sheets 3, at one end of the shim, are shown spread out fan-like in Fig. 1.

The shims can be made up to any thickness desired and from combinations of loose stampings of various thicknesses. These stampings can be made from any material desired, such as brass, copper, bronze, steel, etc. It should furthermore be understood that while I have above referred only to solder as securing the several laminations of the shims together, any substance which will perform this function may be used. The purpose of this substance on the shims is to act as a binder to facilitate the installation of the shims in the bearing, and to provide a laminated shim easily handled in the trade.

Directly adjacent the relatively thick sheet or plate 2 of the shim is preferably the next thickest sheet 7, and the block 6 of Babbitt metal is preferably secured to this sheet. As shown in Fig. 2, the front edge of this sheet projects outwardly beyond the other sheets, and the block is connected to this projecting edge. Preferably, and for the purpose of more securely holding the block, this edge is upset as shown in Figs. 3 to 7, inclusive. In Figs. 3, 4 and 7, the edge is cut at 8 and the severed portions thereof are bent in opposite directions. In Figs. 5 and 6, the edge 8' of the plate 7' is corrugated. As thus constructed, the block clings very securely to the sheet.

In Fig. 8 I have shown two of my improved shims in use on a crank bearing. This bearing comprises two halves 9 and 10, the half 9 being an integral part of the crank 11. These halves are babbitted at 12 and are adapted to be secured together by bolts 13. In assembling the parts, adjustments must be such that when the bolts 13 are tightened the shaft 14 will be held in the bearing so close as to avoid any vibration but free to rotate therein. This fine adjustment is secured by inserting shims 1 of the proper thickness between bearing halves 9 and 10.

In assembling the halves 9 and 10, a shim of approximately the thickness required is selected and assembled in the bearing. If the bearing is found to be too loose, one or more of the thin laminations 3 are broken off until the shim is of the proper thickness. This improved shim is of particular value in repair work when the shaft, through wear, has become loose. In such case the bolts 13 are loosened and one or more of the thin laminations removed whereby the looseness will be taken up when the bolts are again tightened.

As shown in Fig. 8, the shims are so constructed that, when in place, the blocks 6 of Babbitt metal are directly between the ends of the babbit halves 12. When the bolts 13 are tightened the metal blocks 6 are compressed into the babbitt 12 with which they cooperate to form a smooth and substantially jointless bearing for the said shaft.

In Fig. 9, I have shown the several parts of my improved shim in disassembled relation instead of being bound together in a single one-piece shim as illustrated in Fig. 1. The part 2 is the relatively thick sheet or plate heretofore described. The intermediate portion comprises the sheet 7 having the block of Babbitt metal secured to the front edge thereof, as has also been heretofore described. The plate 2 is adapted to seat on one side of the sheet 7 and the several thin sheets 3 on the opposite side thereof. In Fig. 1 all of these parts are lightly stuck together by a bit of solder 5. Such an assemblage makes the shim very convenient to handle and use.

It may be desirable to manufacture and place my shim on the market in the disassembled form shown in Fig. 9, and it should be understood that the shim in such form, and the individual parts thereof, are comprised within the scope of my invention. In this form, the several thin laminations or sheets 3 will preferably be secured together by a bit of solder 15.

Having thus described my invention, what I claim and desire to secure by Letters Patent is—

1. As an article of manufacture, a laminated shim comprising a plurality of relatiely thin sheets of metal superimposed on each other, means lightly and detachably securing the sheets together, the front edge of one of the sheets projecting outwardly of the other sheets, and a block of soft metal secured thereto and extending along the front edge of the shim.

2. As an article of manufacture, a laminated shim comprising a plurality of relatively thin sheets of metal superimposed on each other, means lightly and detachably securing the sheets together, the front edge of one of the sheets projecting outwardly of the other sheets, and this portion of such sheet being formed unevenly to present gripping shoulders or portions, and an elongated block of soft metal secured to the said front edge and in gripping relation to the said shoulders or portions.

3. As an article of manufacture, a laminated shim comprising a plurality of relatively thin sheets of metal superimposed on each other, means lightly and detachably securing the sheets together, the front edge of one of the sheets projecting outwardly of the other sheets and bent out of the plane of the said sheet, and an elongated block of soft metal secured thereto and extending along the front edge of the shim.

4. As an article of manufacture, a laminated shim comprising a plurality of relatively thin sheets of metal superimposed on each other, means lightly and detachably securing the sheets together, the front edge of one of the sheets projecting outwardly of the other sheets and corrugated to extend out of the plane of the said sheet on both sides thereof, and an elongated block of soft metal secured thereto and extending along the front edge of the shim.

5. As an article of manufacture, a laminated shim comprising a plurality of sheets of metal superimposed on each other, the front edge of said sheets being straight and relatively long certain of the sheets projecting outwardly beyond the front edge of the other sheets, and an elongated block of soft metal secured to and along the front edge of said outwardly projecting sheets.

LLOYD A. JOHNSON.